United States Patent
Abad et al.

(10) Patent No.: US 9,399,711 B2
(45) Date of Patent: Jul. 26, 2016

(54) PNEUMATIC OBJECT PROVIDED WITH A GAS-TIGHT LAYER COMPRISING A STYRENE THERMOPLASTIC ELASTOMER AND A POLYPHENYLENE ETHER

(75) Inventors: Vincent Abad, Chamalières (FR); Emmanuel Custodero, Chamalières (FR); Marc Greiveldinger, Châtel Guyon (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 13/518,093

(22) PCT Filed: Dec. 21, 2010

(86) PCT No.: PCT/EP2010/070406
§ 371 (c)(1),
(2), (4) Date: Jul. 27, 2012

(87) PCT Pub. No.: WO2011/076802
PCT Pub. Date: Jun. 30, 2011

(65) Prior Publication Data
US 2012/0285597 A1    Nov. 15, 2012

(30) Foreign Application Priority Data
Dec. 23, 2009    (FR) .................................... 09 59519

(51) Int. Cl.
*B60C 1/00*    (2006.01)
*B60C 5/14*    (2006.01)
(Continued)

(52) U.S. Cl.
CPC ................. *C08L 53/02* (2013.01); *C08L 53/00* (2013.01); *C08L 53/025* (2013.01); *Y10T 152/10495* (2015.01); *Y10T 428/1372* (2015.01); *Y10T 428/1379* (2015.01)

(58) Field of Classification Search
CPC ....... B60C 1/0008; C08L 53/02; C08L 53/00; C08L 53/025; C08L 2666/02; C08L 2666/14; Y10T 152/10495; Y10T 428/1379; Y10T 428/1372
USPC .......... 524/502; 152/450, 510; 428/36.6, 36.4
See application file for complete search history.

(56) References Cited

U.S. PATENT DOCUMENTS

| | | | |
|---|---|---|---|
| 4,946,899 A | 8/1990 | Kennedy et al. | 525/244 |
| 5,260,383 A | 11/1993 | Osman | 525/232 |

(Continued)

FOREIGN PATENT DOCUMENTS

| | | |
|---|---|---|
| EP | 0 572 667 A1 | 12/1993 |
| EP | 0 731 112 A2 | 9/1996 |

(Continued)

OTHER PUBLICATIONS

JP 2002-226665 A (2002), machine translation, JPO Advanced Industrial Property Network.*

(Continued)

*Primary Examiner* — Susannah Chung
*Assistant Examiner* — Josephine Chang
(74) *Attorney, Agent, or Firm* — Fitzpatrick, Cella, Harper & Scinto

(57) ABSTRACT

An inflatable article is provided with an elastomer layer that is airtight to inflation gases used to inflate the article. The elastomer layer includes at least one styrene thermoplastic elastomer, which includes a polyisobutylene block. The elastomer layer also includes a polyphenylene ether (PPE).

9 Claims, 1 Drawing Sheet

(51) Int. Cl.
*C08L 53/02* (2006.01)
*C08L 53/00* (2006.01)

(56) References Cited

U.S. PATENT DOCUMENTS

| | | | |
|---|---|---|---|
| 5,576,373 A * | 11/1996 | Kresge et al. | 524/445 |
| 8,226,868 B2 | 7/2012 | Abad et al. | 264/178 |
| 8,563,098 B2 * | 10/2013 | Abad et al. | 428/12 |
| 2002/0155238 A1 | 10/2002 | Shachi et al. | 428/36.6 |
| 2004/0194863 A1 | 10/2004 | Grah | 152/510 |
| 2009/0151841 A1 | 6/2009 | Jones et al. | 152/510 |
| 2009/0160078 A1 | 6/2009 | Abad et al. | 264/178 |
| 2010/0029852 A1 | 2/2010 | Borkowsky et al. | 525/194 |
| 2010/0175804 A1 * | 7/2010 | Lesage et al. | 152/511 |
| 2010/0263778 A1 * | 10/2010 | Lesage et al. | 152/511 |
| 2011/0108186 A1 | 5/2011 | Abad et al. | 156/114 |
| 2011/0277901 A1 * | 11/2011 | Lesage et al. | 152/510 |
| 2011/0315291 A1 * | 12/2011 | Abad et al. | 152/450 |
| 2012/0003409 A1 * | 1/2012 | Lesage et al. | 428/35.7 |
| 2012/0156400 A1 * | 6/2012 | Abad et al. | 428/12 |
| 2012/0315408 A1 | 12/2012 | Chouvel et al. | 428/12 |
| 2013/0168001 A1 | 7/2013 | Abad et al. | 152/511 |
| 2013/0209716 A1 | 8/2013 | Custodero et al. | 428/36.8 |

FOREIGN PATENT DOCUMENTS

| | | | |
|---|---|---|---|
| EP | 1 431 343 A1 | | 6/2004 |
| EP | 1 561 783 A1 | | 8/2005 |
| EP | 1 566 405 A1 | | 8/2005 |
| EP | 1 987 962 A1 | | 11/2008 |
| EP | 2 006 328 A1 | | 12/2008 |
| EP | 2 072 219 A1 | | 6/2009 |
| JP | 2002-212363 A | | 7/2002 |
| JP | 2002226665 A | * | 8/2002 |
| JP | 2004-161816 A | | 6/2004 |
| JP | 2005-068224 A | | 3/2005 |
| WO | 2005/103146 A1 | | 11/2005 |
| WO | 2006/047509 A2 | | 5/2006 |
| WO | WO 2008/145277 A1 | | 12/2008 |
| WO | WO 2008145277 A1 | * | 12/2008 |
| WO | 2009/007064 A1 | | 1/2009 |
| WO | WO 2009/123611 A1 | | 10/2009 |

OTHER PUBLICATIONS

Yeager, G. "Polyethers, Aromatic," Encyclopedia of Polymer Science and Technology, vol. 11, pp. 67, Table 1 "Thermal Properties of Poly(Phenylene Oxides)s" (2004).*
WO 2008-145277 A1 (2008), machine translation, Google Patents.*
Parapol 950, http://www.solvchem.com/Portals/0/Polyisobutylene%20Parapol%20950.pdf, retrieved Feb. 22, 2013.
Zs. Fodor, et al., "Polyisobutylene-containing block polymers by sequential monomer addition", Polymer Bulletin 29, 697-704 (1992).
J.E. Puskas, et al., "Polyisobutylene-Containing Block Polymers by Sequential Monomer Addition", J. Polymer Science: Part A: Polymer Chemistry, vol. 30, 41-48 (1992).
J.P. Kennedy et al., "Polyisobutylene-Containing Block Polymers by Sequential Monomer Addition", Macromolecules 26, 429 (1993).
J.P. Kennedy, et al., "Polyisobutylene-Containing Block Copolymers by Sequential Monomer Addition", Macromolecules 1991, 24, 6572-6577.
G. Kaszas, et al., "New Thermoplastic Elastomers of Rubbery Polyisobutylene and Glassy Cyclopolyisoprene Segments", Applied Polymer Science 39(1), 119-144 (1990).
J.E. Puskas, et al., "Transparent Flexible UV-Cured Films from Polyisobutylene-Polyisoprene Block Polymers", J. Macromolecular Science, Chemistry A28, 65-80 (1991).
P.S. Tucker, et al., "Thermal, Mechanical, and Morphological Analyses of Poly(2,6-dimethyl-1,4-phenylene oxide)/Styrene-Butadiene-Styrene Blends", Macromolecules 1988, 21, 1678-1685.
Japanese Office Action dated Sep. 30, 2015, in Japanese application No. 2012-545295 (5 pages with partial English translation).

* cited by examiner

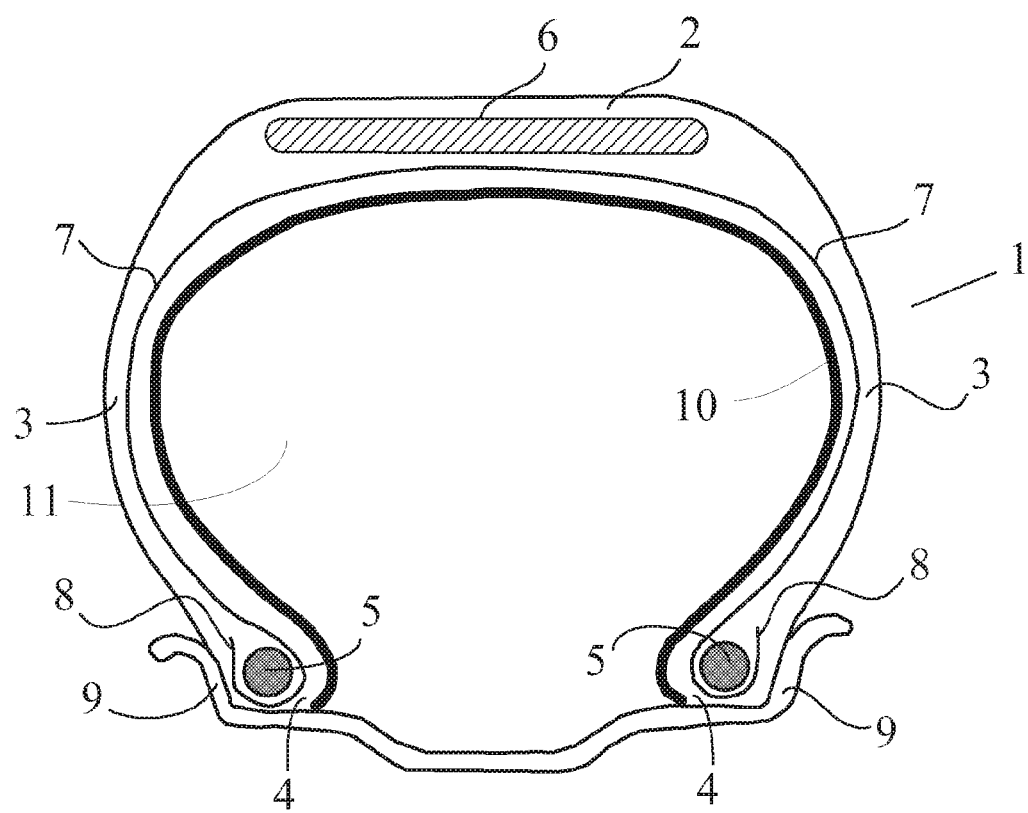

PNEUMATIC OBJECT PROVIDED WITH A GAS-TIGHT LAYER COMPRISING A STYRENE THERMOPLASTIC ELASTOMER AND A POLYPHENYLENE ETHER

FIELD OF THE INVENTION

The present invention relates to "inflatable" articles, that is to say, by definition, to articles which take their usable form when they are inflated with air or with an equivalent inflation gas.

It relates more particularly to the gastight layers which ensure that these inflatable articles are airtight, in particular these for tyres.

BACKGROUND

In a conventional tyre of the tubeless type, the radially internal face comprises an airtight layer (or more generally a layer airtight to any inflation gas) which makes it possible to inflate the tyre and to keep it under pressure. Its airtightness properties allow it to guarantee a relatively low level of pressure loss, making it possible to keep the tyre inflated in a normal operating state for a sufficient period of time, normally of several weeks or several months. Another role of this layer is to protect the carcass reinforcement and more generally the remainder of the tyre from the risk of oxidation due to the diffusion of air originating from the space interior to the tyre.

This role of airtight inner liner or interior rubber is today fulfilled by compositions based on butyl rubber (copolymer of isobutylene and isoprene), which have been recognized for a very long time for their excellent airtightness properties.

However, a well-known disadvantage of the compositions based on butyl rubber or elastomer is that they exhibit high hysteresis losses, furthermore over a broad temperature spectrum, which disadvantage is damaging to the rolling resistance of the tyres.

To reduce the hysteresis of these airtight inner liners and thus, in the end, the fuel consumption of motor vehicles is a general objective which current technology comes up against.

The document WO 2008/145277 of the Applicant companies discloses an inflatable article provided with a layer airtight to the inflation gases, in which the inner liner comprises an elastomer composition comprising at least one copolymeric thermoplastic elastomer comprising polystyrene and polyisobutylene blocks and a polybutene oil.

In comparison with a butyl rubber, the TPS elastomer exhibits the major advantage, due to its thermoplastic nature, of being able to be worked as is in the molten (liquid) state and consequently of offering the possibility of simplified processing.

However, under some rolling stresses, the temperature stability of such an airtight layer based on TPS elastomer may prove to be inadequate, in particular at high temperature and under stress.

BRIEF DESCRIPTION OF THE INVENTION

A subject-matter of the invention is an inflatable article provided with an elastomer layer which is airtight to the inflation gases, comprising at least one styrene thermoplastic elastomer comprising a polyisobutylene block. This inflatable article is characterized in that the airtight elastomer layer additionally comprises a polyphenylene ether ("PPE").

The Applicant Companies have discovered that the presence of a polyphenylene ether makes it possible to substantially improve the temperature stability of the gastight elastomer composition and in particular its creep strength under stress at high temperature.

The gastight layers of the inflatable articles according to one of the subject-matters of the invention also exhibit the advantage of having a substantially improved gastightness.

The invention relates in particular to inflatable articles made of rubber, such as tyres, or inner tubes, in particular inner tubes for tyres.

The invention relates more particularly to the tyres intended to equip motor vehicles of the following types: passenger vehicles, SUVs (Sports Utility Vehicles), two-wheel vehicles (in particular motorcycles), aircraft, such as industrial vehicles chosen from vans, heavy-duty vehicles—that is to say, underground, bus, heavy road transport vehicles (lorries, tractors, trailers) or off-road vehicles, such as agricultural vehicles or earth-moving equipment—or other transportation or handling vehicles.

BRIEF DESCRIPTION OF THE DRAWING

The invention and its advantages will be easily understood in the light of the description and implementation examples which follow and also from the single FIGURE relating to these examples, which gives a diagrammatic representation, in radial cross section, of a tyre in accordance with the invention.

I. DETAILED DESCRIPTION OF THE INVENTION

In the present description, the expression phr means part by weight per hundred parts of total elastomer (if several elastomers are present) and, unless expressly indicated otherwise, all the percentages (%) shown are % by weight.

Furthermore, any range of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

I-1. Gastight Elastomer Layer

The gastight elastomer layer of the inflatable article according to the invention has the essential characteristic of comprising at least one styrene thermoplastic elastomer comprising a polyisobutylene elastomer block and a polyphenylene ether in the stated proportions.

I-1-A. Styrene Thermoplastic Elastomer Comprising a Polyisobutylene Block

Thermoplastic elastomers (abbreviated to "TPE") have a structure intermediate between thermoplastic polymers and elastomers. They are composed of rigid thermoplastic blocks connected via flexible elastomer blocks, for example polybutadiene, polyisoprene, poly(ethylene/butylene) or polyisobutylene. They are often triblock elastomers with two rigid segments connected via a flexible segment. The rigid and flexible segments can be positioned linearly, in star fashion or in branched fashion. Typically, each of these segments or blocks comprises at least more than 5, generally more than 10, base units (for example, styrene units and isoprene units for a styrene/isoprene/styrene block copolymer).

The thermoplastic elastomer according to a subject-matter of the invention is characterized in that it is chosen from styrene thermoplastic elastomers ("TPS"). Styrene monomer should be understood as meaning, in the present description, any monomer based on unsubstituted or substituted styrene;

mention may be made, among substituted styrenes, for example, of methylstyrenes (for example, o-methylstyrene, m-methylstyrene or p-methylstyrene, α-methylstyrene, α,2-dimethylstyrene, α,4-dimethylstyrene or diphenylethylene), para-(tert-butyl)styrene, chlorostyrenes (for example, o-chlorostyrene, m-chlorostyrene, p-chlorostyrene, 2,4-dichlorostyrene, 2,6-dichlorostyrene or 2,4,6-trichlorostyrene), bromostyrenes (for example, o-bromostyrene, m-bromostyrene, p-bromostyrene, 2,4-dibromostyrene, 2,6-dibromostyrene or 2,4,6-tribromostyrene), fluorostyrenes (for example, o-fluorostyrene, m-fluorostyrene, p-fluorostyrene, 2,4-difluorostyrene, 2,6-difluorostyrene or 2,4,6-trifluorostyrene) or para-hydroxystyrene.

The styrene thermoplastic elastomer according to the invention comprises a polyisobutylene-based elastomer block (abbreviated to "TPSI"). Polyisobutylene-based elastomer block is understood to mean not only an isobutylene homopolymer but also a copolymer of isobutylene and of isoprene, and also the halogenated derivatives, in particular generally brominated or chlorinated derivatives, of these homopolymers and copolymers.

Preferably, the styrene thermoplastic elastomer is a copolymer comprising polystyrene and polyisobutylene blocks. Such a definition should be understood as comprising any thermoplastic copolymer comprising at least one polystyrene block (that is to say, one or more polystyrene blocks) and at least one polyisobutylene block (that is to say, one or more polyisobutylene blocks), with which other blocks (for example, polyethylene and/or polypropylene blocks) and/or other monomer units (for example, unsaturated units, such as diene units) may or may not be associated.

Preferably, such a block copolymer is a styrene/isobutylene diblock copolymer (abbreviated to "SIB").

More preferably still, such a block copolymer is a styrene/isobutylene/styrene triblock copolymer (abbreviated to "SIBS").

According to a preferred embodiment of the invention, the content by weight of styrene in the styrene thermoplastic elastomer is between 5 and 50%. Below the minimum indicated, the thermoplastic nature of the elastomer risks being substantially reduced, whereas, above the recommended maximum, the elasticity of the airtight layer may be affected. For these reasons, the styrene content is more preferably between 10 and 40%, in particular between 15 and 35%.

It is preferable for the glass transition temperature (Tg, measured according to ASTM D3418) of the TPSI elastomer to be less than −20° C., more preferably less than −40° C. A Tg value greater than these minima may reduce the performance of the airtight layer during use at very low temperature; for such a use, the Tg of the TPSI elastomer is more preferably still less than −50° C.

The number-average molecular weight (denoted Mn) of the TPSI elastomer is preferably between 30 000 and 500 000 g/mol, more preferably between 40 000 and 400 000 g/mol. Below the minima indicated, there is a risk of the cohesion between the chains of the elastomer being affected, in particular due to the possible dilution of the said elastomer with an extending oil; moreover, an increase in the operating temperature risks affecting the mechanical properties, in particular the breaking properties, with a consequence of a reduced performance "under hot conditions". Furthermore, an excessively high weight Mn can be damaging with regard to the flexibility of the gastight layer. Thus, it has been found that a value within a range from 50 000 to 300 000 g/mol is particularly well suited, in particular to use of the composition in a tyre.

The number-average molecular weight (Mn) of the TPSI elastomer is determined in a known way by steric exclusion chromatography (SEC). The sample is dissolved beforehand in tetrahydrofuran at a concentration of approximately 1 g/l; the solution is then filtered through a filter with a porosity of 0.45 μm before injection. The equipment used is a "Waters alliance" chromatographic line. The elution solvent is tetrahydrofuran, the flow rate is 0.7 ml/min, the temperature of the system is 35° C. and the analytical time is 90 min. A set of four Waters columns in series, with the "Styragel" trade names ("HMW7", "HMW6E" and two "HT6E"), is used. The injected volume of the solution of the polymer sample is 100 μl. The detector is a "Waters 2410" differential refractometer and its associated software for making use of the chromatographic data is the "Waters Millennium" system. The calculated average molar masses are relative to a calibration curve produced with polystyrene standards.

The polydispersity index PI (it should be remembered that PI=Mw/Mn, with Mw the weight-average molecular weight) of the TPSI elastomer is preferably less than 3; more preferably PI is less than 2.

If further optional elastomers are used in the gastight layer, the styrene thermo-plastic elastomer comprising the polyisobutylene block constitutes the predominant elastomer by weight; it then preferably represents more than 50% by weight, more preferably more than 70% by weight, of the combined elastomers present in the gastight layer. Such additional elastomers, which are a minority by weight, might, for example, be diene elastomers, such as natural rubber or a synthetic polyisoprene, a butyl rubber or thermoplastic elastomers other than styrene thermoplastic elastomers.

The styrene thermoplastic elastomer comprising a polyisobutylene block is preferably the only constituent thermoplastic elastomer of the gastight elastomer layer.

The TPSI elastomers can be processed conventionally, by extrusion or moulding, for example starting from a starting material available in the form of beads or granules.

The TPSI elastomers are available commercially, for example sold, as regards the SIB and SIBS, by Kaneka under the name "Sibstar" (e.g. "Sibstar 103T", "Sibstar 102T", "Sibstar 073T" or "Sibstar 072T" for the SIBSs or "Sibstar 042D" for the SIBS). They have, for example, been described, along with their synthesis, in the patent documents EP 731 112, U.S. Pat. No. 4,946,899 and U.S. Pat. No. 5,260,383. They have been developed first of all for biomedical applications and then described in various applications specific to TPSI elastomers, as varied as medical equipment, motor vehicle or domestic electrical appliance parts, sheathings for electric wires, or airtight or elastic parts (see, for example, EP 1 431 343, EP 1 561 783, EP 1 566 405 and WO 2005/103146).

I-1-B. Polyphenylene Ether (PPE)

The gastight composition has the other essential characteristic of comprising, in combination with the TPSI elastomer described above, at least one polyphenylene ether (denoted as abbreviation "PPE").

PPEs are well known to a person skilled in the art; they are resins which are solid at ambient temperature (23° C.), which are compatible with styrene polymers and which are used in particular to increase the Tg of TPS elastomers (see, for example, "*Thermal, Mechanical and Morphological Analyses of Poly(2,6-dimethyl-1,4-phenylene oxide)/Styrene-Butadiene-Styrene Blends*", Tucker, Barlow and Paul, Macromolecules, 1988, 21, 1678-1685).

Preferably, the PPE used here has a glass transition temperature (hereinafter denoted Tg) which is greater than 150° C., more preferably greater than 180° C. With regard to its number-average molecular weight (Mn), it is preferably between 5000 and 100 000 g/mol.

The number-average molecular weight (Mn) is determined in a known way by steric exclusion chromatography (SEC). The sample is dissolved beforehand in tetra-hydrofuran at a concentration of approximately 1 g/l; the solution is then filtered through a filter with a porosity of 0.45 µm before injection. The equipment used is a "Waters alliance" chromatographic line. The elution solvent is tetrahydrofuran, the flow rate is 0.7 ml/min, the temperature of the system is 35° C. and the analytical time is 90 min. A set of four Waters columns in series, with "Styragel" trade names ("HMW7", "HMW6E" and two "HT6E"), is used. The injected volume of the solution of the polymer sample is 100 µl. The detector is a "Waters 2410" differential refractometer and its associated software for making use of the chromatographic data is the "Waters Millennium" system. The calculated average molar masses are relative to a calibration curve produced with polystyrene standards.

Mention may in particular be made, as nonlimiting examples of PPE polymers which can be used in the airtight composition according to a subject-matter of the invention, of those chosen from the group consisting of poly(2,6-dimethyl-1,4-phenylene ether), poly(2,6-dimethyl-co-2,3,6-trimethyl-1,4-phenylene ether), poly(2,3,6-trimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly-(2,6-dipropyl-1,4-phenylene ether), poly(2-ethyl-6-propyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), poly(3-bromo-2,6-dimethyl-1,4-phenylene ether), their respective copolymers, and the blends of these homopolymers or copolymers.

According to a specific and preferred embodiment, the PPE used is poly(2,6-dimethyl-1,4-phenylene ether). Such commercially available PPEs are, for example, the products "Xyron S202" from Asahi Kasei or "Noryl SA120" from Sabic.

Preferably, in the gastight layer, the amount of polymer PPE is adjusted in such a way that the content by weight of PPE is between 0.05 and 5 times, more preferably between 0.1 and 2 times, the content by weight of styrene present in the styrene thermoplastic elastomer comprising a polyisobutylene block itself. Below the minima recommended, there is no visible effect of the presence of PPE and, above 5 times, an excessively great increase in the stiffness of the gastight layer is observed.

For all these reasons, the content by weight of PPE is more preferably still between 0.2 and 1.5 times the content by weight of styrene in the styrene thermoplastic elastomer comprising a polyisobutylene block.

I-1-C. Extending Oil

The preceding elastomer with, in addition, polyphenylene ether are sufficient by themselves alone to fulfil the functions of gastightness and of improving the temperature stability with regard to the inflatable articles in which they are used.

However, according to a preferred embodiment of the invention, the gastight layer described above also comprises, as plasticizing agent, an extending oil (or plasticizing oil), the role of which is to facilitate the processing of the gastight layer, particularly its incorporation in the inflatable article, by a lowering of the modulus and an increase in the tackifying power.

Use may be made of any extending oil, preferably having a weakly polar nature, capable of extending or plasticizing elastomers, in particular thermoplastic elastomers. At ambient temperature (23° C.), these oils, which are more or less viscous, are liquids (that is to say, to recapitulate, substances having the ability to eventually assume the shape of their container), in contrast in particular to resins or rubbers, which are solids by nature.

Preferably, the extending oil is chosen from the group consisting of polyolefin oils (that is to say, resulting from the polymerization of olefins, monoolefins or diolefins), paraffinic oils, naphthenic oils (of low or high viscosity), aromatic oils, mineral oils and mixtures of these oils.

Use is preferably made of an oil of polybutene type, in particular a polyisobutylene oil (abbreviated to "PIB"), which has demonstrated the best compromise in properties in comparison with the other oils tested, in particular with a conventional oil of the paraffinic type.

By way of examples, polyisobutylene oils are sold in particular by Univar under the name "Dynapak Poly" (e.g., "Dynapak Poly 190"), by Ineos Oligomer under the name "Indopol H1200" or by BASF under the names "Glissopal" (e.g., "Glissopal 1000") and "Oppanol" (e.g., "Oppanol B12"); paraffinic oils are sold, for example, by Exxon under the name "Telura 618" or by Repsol under the name "Extensol 51".

The number-average molecular weight (Mn) of the extending oil is preferably between 200 and 25000 g/mol and more preferably still between 300 and 10 000 g/mol. For excessively low weights Mn, there exists a risk of migration of the oil outside the composition, whereas excessively high weights can result in excessive stiffening of this composition. A weight Mn of between 350 and 4000 g/mol, in particular between 400 and 3000 g/mol, has proved to constitute an excellent compromise for the target applications, in particular for use in a tyre.

The number-average molecular weight (Mn) of the extending oil is determined by SEC, the sample being dissolved beforehand in tetrahydrofuran at a concentration of approximately 1 g/l; the solution is then filtered through a filter with a porosity of 0.45 µm before injection. The equipment is the "Waters Alliance" chromatographic line. The elution solvent is tetrahydrofuran, the flow rate is 1 ml/min, the temperature of the system is 35° C. and the analytic time is 30 min. Use is made of a set of two "Waters" columns bearing the name "Styragel HT6E". The injected volume of the solution of the polymer sample is 100 µl. The detector is a "Waters 2410" differential refractometer and its associated software for making use of the chromatographic data is the "Waters Millennium" system. The calculated average molar masses are relative to a calibration curve produced with polystyrene standards.

A person skilled in the art will be able, in the light of the description and implementational examples which follow, to adjust the amount of extending oil as a function of the specific conditions of use of the gastight elastomer layer, in particular of the inflatable article in which it is intended to be used.

It is preferable for the content of extending oil to be greater than 5 phr, preferably between 5 and 150 phr.

Below the minimum indicated, the presence of extending oil is not noticeable.

Above the recommended maximum, the risk is encountered of insufficient cohesion of the composition and of loss in airtightness which may be harmful depending on the application under consideration.

For these reasons, in particular for use of the airtight composition in a tyre, it is preferable for the content of extending oil to be greater than 10 phr, in particular between 10 and 130 phr, more preferably still for it to be greater than 20 phr, in particular between 20 and 100 phr.

I-1-D. Platy Filler

The use of platy filler advantageously makes it possible to lower the coefficient of permeability (and thus to increase the airtightness) of the elastomer composition without excessively increasing its modulus, which makes it possible to retain the ease of incorporation of the airtight layer in the inflatable article.

"Platy" fillers are well known to a person skilled in the art. They have been used in particular in tyres to reduce the permeability of conventional gastight layers based on butyl rubber. They are generally used in these butyl-based layers at relatively low contents not exceeding generally from 10 to 15 phr (see, for example, the patent documents US 2004/0194863 and WO 2006/047509).

They are generally provided in the form of stacked plates, platelets, sheets or lamellae, with a more or less marked anisometry. Their aspect ratio ($A=L/T$) is generally greater than 3, more often greater than 5 or than 10, L representing the mean length (or greatest dimension) and T representing the mean thickness of these platy fillers, these means being calculated on a number basis. Aspect ratios reaching several tens, indeed even several hundreds, are frequent. Their mean length is preferably greater than 1 µm (that is to say that "micrometric" platy fillers are then involved), typically between several µm (for example 5 µm) and several hundred µm (for example 500 µm, indeed even 800 µm).

Preferably, the platy fillers used in accordance with the invention are chosen from the group consisting of graphites, phyllosilicates and the mixtures of such fillers. Mention will in particular be made, among phyllosilicates, of clays, talcs, micas or kaolins, it being possible for these phyllosilicates to be or not to be modified, for example by a surface treatment; mention may in particular be made, as examples of such modified phyllosilicates, of micas covered with titanium oxide or clays modified by surfactants ("organo clays").

Use is preferably made of platy fillers having a low surface energy, that is to say which are relatively nonpolar, such as those chosen from the group consisting of graphites, talcs, micas and the mixtures of such fillers, it being possible for the latter to be or not to be modified, more preferably still from the group consisting of graphites, talcs and the mixtures of such fillers. Mention may in particular be made, among graphites, of natural graphites, expanded graphites or synthetic graphites.

Mention may be made, as examples of micas, of the micas sold by CMMP (Mica-MU®, Mica-Soft® and Briomica®, for example), vermiculites (in particular the vermiculite Shawatec® sold by CMMP or the vermiculite Microlite® sold by W.R. Grace) or modified or treated micas (for example, the Iriodin® range sold by Merck or the micas sold by Yamaguchi (A51S, A41S, SYA-21R, SYA-21RS, A21S and SYA-41R)). Mention may be made, as examples of graphites, of the graphites sold by Timcal (Timrex® range). Mention may be made, as examples of talcs, of the talcs sold by Luzenac.

The platy fillers described above can be used at variable contents, in particular between 2 and 30% by volume of elastomer composition and preferably between 3 and 20% by volume.

The introduction of the platy fillers into the thermoplastic elastomer composition can be carried out according to various known processes, for example by solution mixing, by bulk mixing in an internal mixer or by extrusion mixing.

I-1-E. Various Additives

The airtight layer or composition described above can furthermore comprise the various additives normally present in the airtight layers known to a person skilled in the art. Mention will be made, for example, of reinforcing fillers, such as carbon black or silica, non-reinforcing or inert fillers other than the platy fillers described above, colouring agents which can advantageously be used for the colouring of the composition, plasticizers other than the abovementioned extending oils, tackifying resins, protecting agents, such as antioxidants or antiozonants, UV stabilizers, various processing aids or other stabilizing agents, or promoters capable of promoting the adhesion of the inflatable article to the remainder of the structure.

In addition to the elastomers described above, the gastight composition might also comprise, always according to a minor fraction by weight with respect to the block elastomer, polymers other than elastomers, such as, for example, thermoplastic polymers.

I-2. Use of the Airtight Layer in a Tyre

The composition based on block elastomer described above can be used as airtight layer in any type of inflatable article. Mention may be made, as examples of such inflatable articles, of inflatable boats, or balloons or balls used for play or sport.

It is particularly well suited to use as airtight layer (or layer airtight to any other inflation gas, for example nitrogen) in an inflatable article, finished product or semi-finished product made of rubber, very particularly in a tyre for a motor vehicle, such as a vehicle of two-wheel, passenger or industrial type.

Such an airtight layer is preferably positioned on the internal wall of the inflatable article but it can also be fully incorporated in its internal structure.

The thickness of the airtight layer is preferably greater than 0.05 mm, more preferably between 0.1 mm and 10 mm, in particular between 0.1 and 1.0 mm.

It will be easily understood that, depending on the specific fields of application, the dimensions and the pressures at work, the embodiment of the invention can vary, the airtight layer then comprising several preferred ranges of thickness.

Thus, for example, for tyres of passenger vehicle type, it can have a thickness of at least 0.05 mm, preferably of between 0.1 and 2 mm. According to another example, for tyres for heavy-duty or agricultural vehicles, the preferred thickness can be between 1 and 3 mm. According to another example, for tyres for vehicles in the civil engineering field or for aircraft, the preferred thickness can be between 2 and 10 mm.

In comparison with an airtight layer as disclosed in the document WO 2008/145277 A1, the airtight layer according to the invention has the advantage of having a markedly improved temperature stability as well as a gastightness which is itself improved, as is demonstrated in the following implementational examples.

II. EXAMPLES OF THE IMPLEMENTATION OF THE INVENTION

The gastight layer described above can advantageously be used in tyres for all types of vehicles, in particular passenger vehicles or industrial vehicles, such as heavy-duty vehicles.

By way of example, the single appended FIGURE represents, highly diagrammatically (without observing a specific scale), a radial cross section of a tyre in accordance with the invention.

This tyre 1 comprises a crown 2 reinforced by a crown reinforcement or belt 6, two sidewalls 3 and two beads 4, each of these beads 4 being reinforced with a bead thread 5. The crown 2 is surmounted by a tread not represented in this diagrammatic FIGURE. A carcass reinforcement 7 is wound around the two bead threads 5 in each bead 4, the turn-up 8 of this reinforcement 7 being, for example, positioned towards the outside of the tyre 1, which is here represented fitted to its wheel rim 9. The carcass reinforcement 7 is, in a way known per se, composed of at least one ply reinforced by "radial" cables, for example textile or metal cables, that is to say that these cables are positioned virtually parallel to one another and extend from one bead to the other, so as to form an angle of between 80° and 90° with the median circumferential plane (plane perpendicular to the axis of rotation of the tyre which is situated at mid-distance from the two beads 4 and passes through the middle of the crown reinforcement 6).

The internal wall of the tyre 1 comprises an airtight layer 10, for example with a thickness equal to approximately 0.9 mm, from the side of the internal cavity 11 of the tyre 1.

This inner liner covers the whole of the internal wall of the tyre, extending from one sidewall to the other, at least up to the level of the rim flange when the tyre is in the fitted position. It defines the radially internal face of the said tyre intended to protect the carcass reinforcement from the diffusion of air originating from the space 11 interior to the tyre. It makes possible the inflation and the maintenance under pressure of the tyre; its airtightness properties must allow it to guarantee a relatively low degree of loss in pressure and to keep the tyre inflated, in the normal operating state, for a sufficient period of time, normally of several weeks or several months.

In contrast to a conventional tyre using a composition based on butyl rubber, the tyre in accordance with the invention uses, in this example, as airtight layer 10, an elastomer composition comprising an SIBS elastomer ("Sibstar 102T or 103T" with a styrene content of respectively 15% and 30% approximately, a Tg of approximately −65° C. and an Mn of approximately 90 000 g/mol), and a poly(2,6-dimethyl-1,4-phenylene ether) ("Xyron® S202A sold by Asahi Kasei, or "Noryl SA120" from Sabic) extended with a PIB oil (for example, Indopol H1200 oil—Mn of the order of 2100 g/mol), and also a platy filler (SYA41R from Yamaguchi).

A layer (skim) of the gastight layer can be produced in particular with the device described in the document EP 2 072 219 A1. This device comprises an extrusion tool, such as a twin-screw extruder, a die, a liquid cooling bath and a movable level support.

The tyre provided with its airtight layer 10 as described above can be produced before or after vulcanization (or curing).

In the first case (i.e., before curing the tyre), the airtight layer is simply applied conventionally to the desired spot for formation of the layer 10. Vulcanization of the tyre is subsequently carried out conventionally.

An advantageous alternative form of manufacture for a person skilled in the art of tyres will consist, for example, during the first stage, in depositing, flat, the airtight layer directly on a building drum, in the form of a layer (skim) of suitable thickness, before covering the latter with the remainder of the structure of the tyre, according to manufacturing techniques well known to a person skilled in the art.

In the second case (i.e., after curing the tyre), the airtight layer is applied inside the cured tyre by any appropriate means, for example by adhesive bonding, by spraying or also extrusion and blowing of a film of appropriate thickness.

II-1. Tests

The properties of the gastight elastomer compositions are characterized as indicated below.

A Test for Determining a Thermal Softening Temperature

The following test is used to characterize the softening temperature of a composition:

Equipment: dynamic mechanical analyser (DMA Q800), sold by TA Instruments;

Sample: of cylindrical shape, it is produced using a hollow punch and measures on average 13 mm in diameter for a thickness of 2 mm;

Stress: the sample holder has the form of a compressive jaw; this part is composed of a movable upper plate (15 mm in diameter) and of a fixed lower plate (15 mm in diameter); the sample is placed between these two plates; the movable part makes it possible to apply a precise stress to the sample of 1 N; the setup is placed in an oven which makes it possible to produce a temperature gradient from ambient temperature to 180° C. at 3° C./min, during which the strain of the sample is recorded;

Interpretation: the results are provided in the form of a curve for strain of the sample as a function of the temperature; the softening temperature is regarded as that for which the material exhibits a decrease in its thickness of 10%.

B Test for Determining a Temperature for Failure Under Thermomechanical Creep

The principle and the experimental conditions used for this measurement differ from the above. This is because the thermomechanical creep strength is evaluated here by the determination of a temperature at which the creep of the test specimen results in the failure of a film (temperature for failure of the sample).

Equipment: dynamic mechanical analyser (DMA Q800), sold by TA Instruments;

Sample: it is provided in the form of a film with a width of 4 mm and a thickness of 0.5 mm;

Stress: the sample holder is composed of 2 jaws which will grip the ends of the sample; the distance between jaws is from 12 to 13 mm; the upper jaw is movable, whereas the lower jaw is fixed. The movable jaw makes it possible to apply a force of 1 N to the sample; the entire setup is placed in an oven which makes it possible to produce a temperature gradient from ambient temperature to 180° C. (3° C./min) during which the strain of the sample is recorded;

Interpretation: the results are provided in the form of a curve of strain as a function of the temperature; as the sample is subjected to a constant force, its strain will vary significantly during its softening; this creep phenomenon precedes the failure of the material, for which reason the temperature at which failure occurs is selected as indicator of the temperature stability of the material.

C Airtightness Tests

Use was made, for this analysis, of a rigid wall permeameter, placed in an oven (temperature at 60° C. in the present case), equipped with a relative pressure sensor (calibrated in the range from 0 to 6 bar) and connected to a tube equipped with an inflation valve. The permeameter can receive standard test specimens in the disk form (for example, with a diameter of 65 mm in the present case) and with a uniform thickness which can range up to 1.5 mm (0.5 mm in the present case). The pressure sensor is connected to a National Instruments data acquisition card (0-10 V analogue four-channel acquisition) which is connected to a computer carrying out continuous acquisition with a frequency of 0.5 Hz (1 point every two seconds). The permeability coefficient (K) is measured from the linear regression line giving the slope a of the loss in pressure through the tested test specimen as a function of the time, after stabilization of the system, that is to say the achievement of stable conditions under which the pressure decreases linearly as a function of the time.

II-2. Tests

II-2-A. 1st Test

The softening temperatures of an airtight elastomer composition based on SIBS (Sibstar 102 T comprising 15% by weight of styrene), with and without addition of poly(2,6-dimethyl-1,4-phenylene ether), are compared in Table 1.

TABLE 1

|  | Reference | A1 |
|---|---|---|
| SIBS - Sibstar 102 T ® - Kaneka - (phr) | 100 | 100 |
| PIB oil - H1200 - Ineos Oligomer - (phr) | 67 | 67 |
| Platy filler - SYA41R ® - Yamaguchi[1] - % by volume (phr) | 10% (54 phr) | 10% (54 phr) |
| Poly(2,6-dimethyl-1,4-phenylene ether) - Xyron ® S202A - Asahi Kasei - % by weight with respect to the styrene blocks of the SIBS (phr) | 0 | 50% (7.5 phr) |
| Softening temperature (° C.) | 122 | 140 |
| Softening temperature (base 100) | 100 | 115 |

[1]The density of the platy filler used is: $\rho = 2.85$ g/cm$^3$.

This table shows that the fact of using 50% by weight of Xyron S202A with respect to the styrene content of the SIBS makes it possible to improve the softening temperature by 15% and thus the temperature stability.

II-2-B. 2nd Test

The temperature stabilities, assessed by the temperature for failure under creep of airtight formulations based on SIBS (102T) with and without addition of Xyron® S202A, are compared in Table 2.

TABLE 2

|  | Reference | B1 | B2 |
|---|---|---|---|
| SIBS - Sibstar 103 T - Kaneka - (phr) | 100 | 100 | 100 |
| PIB oil - H1200 - Ineos Oligomer - (phr) | 67 | 67 | 67 |
| Platy filler - SYA41R ® - Yamaguchi - % by volume (phr) | 10% (54 phr) | 10% (54 phr) | 10% (54 phr) |
| Poly(2,6-dimethyl-1,4-phenylene ether) - Xyron ® S202A - Asahi Kasei - (% by weight with respect to the styrene blocks of the SIBS) (phr) | 0 | 50% (7.5 phr) | 200% (30 phr) |
| Temperature for failure under creep (° C.) | 41 | 51 | 59 |
| Temperature for failure under creep (base 100) | 100 | 124 | 144 |

Table 2 clearly shows that the addition to the formulation of 50% and then 200% by weight of Xyron® S202A, with respect to the styrene content of the SIBS, significantly improves the thermomechanical creep strength, this improvement being in proportion as the amount introduced increases.

II-2-C. Airtightness Tests

The results of airtightness tests (measurement of the permeability coefficient K of the test specimen) on airtight compositions based on SIBS, with and without addition of poly(2,6-dimethyl-1,4-phenylene ether), are presented in Table 3.

TABLE 3

|  | Ref. 1 | C1 | Ref. 2 | C2 |
|---|---|---|---|---|
| SIBS - Sibstar 103T ® - Kaneka (phr) | 100 | 100 | 100 | 100 |
| PIB oil - H1200 - Ineos Oligomer - (phr) | 100 | 100 | 67 | 67 |
| Platy filler - SYA41R ® - Yamaguchi - (% by volume) (phr) | 10% (69 phr) | 10% (69 phr) | 0% | 0% |
| Poly(2,6-dimethyl-1,4-phenylene ether) - Xyron ® - Asahi Kasei - (% by weight with respect to the styrene blocks of the SIBS) (phr) | 0 | 50% (7.5 phr) | 0 | 200% (30 phr) |
| K ($10^{-17}$ m$^4 \cdot$ N$^{-1} \cdot$ s$^{-1}$) | 1.66 | 1.15 | 3.63 | 3.01 |
| K (base 100) | 100 | 144 | 100 | 121 |

The introduction of 50% by weight of Xyron S202A, with respect to the styrene content of the SIBS (C1) makes it possible to significantly improve the airtightness of a filler-comprising formulation.

It should be noted that, in the absence of platy filler, poly(2,6-dimethyl-1,4-phenylene ether) (C2) also improves the airtightness with respect to composition Ref 2.

This improvement in the airtightness performance of the elastomer compositions based on SIBS comprising poly(2,6-dimethyl-1,4-phenylene ether) is entirely unexpected.

What is claimed is:

1. An inflatable article comprising an elastomer layer that is airtight to at least one inflation gas used to inflate the article,
    wherein the elastomer layer includes:
        a styrene thermoplastic elastomer;
        a polyphenylene ether; and
        a polyisobutylene extending oil at a content of between 67 and 100 phr,
    wherein the styrene thermoplastic elastomer is a styrene/isobutylene/styrene triblock copolymer (SIBS),
    wherein the polyphenylene ether is poly(2,6-dimethyl-1,4-phenylene ether); and
    wherein a content by weight of polyphenylene ether represents between 0.5 and 2 times a content by weight of styrene present in the styrene thermoplastic elastomer.

2. The inflatable article according to claim 1, wherein the polyphenylene ether has a glass transition temperature of greater than 150° C.

3. The inflatable article according to claim 1, wherein the elastomer layer includes a plurality of elastomers, and
    wherein the styrene thermoplastic elastomer is at a predominant content by weight relative to all of the plurality of elastomers of the elastomer layer.

4. The inflatable article according to claim 1, wherein the styrene thermoplastic elastomer is a sole elastomer of the elastomer layer.

5. The inflatable article according to claim 1, wherein the elastomer layer further includes a platy filler at a content of between 2% and 30% by volume.

6. The inflatable article according to claim 1, wherein the inflatable article is a rubber article.

7. The inflatable article according to claim 6, wherein the rubber article is a tire.

8. The inflatable article according to claim 6, wherein the inflatable article is an inner tube.

9. The inflatable article according to claim 8, wherein the inner tube is a tire inner tube.

* * * * *